United States Patent
Barrenscheen et al.

(10) Patent No.: US 6,507,298 B1
(45) Date of Patent: Jan. 14, 2003

(54) METHOD FOR SELECTING, PRIORITIZING, AND A/D CONVERSION OF ANALOG SIGNALS, AND A/D CONVERTER CONFIGURATION THAT PRIORITIZES AND SELECTS SIGNALS

(75) Inventors: Jens Barrenscheen, München (DE); Gunther Fenzl, Höhenkirchen-Siegertsbrunn (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/708,280

(22) Filed: Nov. 8, 2000

Related U.S. Application Data

(63) Continuation of application No. PCT/DE99/01068, filed on May 6, 1999.

(30) Foreign Application Priority Data

May 8, 1998 (DE) .......................................... 198 20 737

(51) Int. Cl.[7] ................................................. H03M 1/12
(52) U.S. Cl. ...................................................... 341/141
(58) Field of Search ........................................ 341/141

(56) References Cited

U.S. PATENT DOCUMENTS

| | | | |
|---|---|---|---|
| 5,302,952 A | | 4/1994 | Campbell, Jr. et al. |
| 5,331,324 A | * | 7/1994 | Nakajima ................... 341/141 |
| 5,349,351 A | | 9/1994 | Obara et al. |
| 5,619,201 A | | 4/1997 | Imakura |
| 5,675,337 A | | 10/1997 | Moriyama |

FOREIGN PATENT DOCUMENTS

| | | |
|---|---|---|
| DE | 43 05 046 A1 | 9/1993 |
| DE | 195 50 341 A1 | 11/1997 |

* cited by examiner

Primary Examiner—Howard L. Williams
(74) Attorney, Agent, or Firm—Laurence A. Greenberg; Werner H. Stemer; Gregory L. Mayback

(57) ABSTRACT

A method for A/D conversion of analog signals using an A/D converter, and to an appropriate A/D converter circuit. In order to process converter request signals from different converter request sources requesting analog signals for conversion, the invention proposes assigning definable, selectable priorities to the different converter request sources. If there is a request for A/D conversion from a converter request source, the system establishes which of the converter request sources requesting A/D conversion has the highest priority. An analog signal from this selected converter request source is then supplied to the A/D converter.

19 Claims, 3 Drawing Sheets

METHOD FOR SELECTING, PRIORITIZING, AND A/D CONVERSION OF ANALOG SIGNALS, AND A/D CONVERTER CONFIGURATION THAT PRIORITIZES AND SELECTS SIGNALS

CROSS-REFERENCE TO RELATED APPLICATION

This is a continuation of copending International Application PCT/DE99/01068, filed May 6, 1999, which designated the United States.

BACKGROUND OF THE INVENTION

FIELD OF THE INVENTION

The present invention relates to a method for A/D conversion of analog signals using A/D converters, and to an appropriate A/D converter configuration.

In complex applications, different analog input signals need to be supplied to an A/D converter and converted in response to various events. The input signals to be converted can be requested at will by different request sources. In this context, the request sources produce request signals for the conversion selection method in order thus to request the A/D conversion of a particular signal channel in the A/D converter.

The constantly increasing number of input channels in A/D converter configurations and the fact that A/D conversion generally involves very time-critical applications make precise observance of the sequence of the signals to be converted absolutely necessary. This is particularly relevant if the analog signals supplied originate not just from an individual request source, such as a timer or a software application, but from a multiplicity of different request sources. In this case in particular, with requests for A/D conversion being supplied to the A/D converter configuration simultaneously, these requests need to be processed according to prescribed decision criteria (order) and, in particular, on the basis of their importance.

SUMMARY OF THE INVENTION

It is accordingly an object of the invention to provide a method for A/D conversion of analog signals, and an A/D converter configuration which overcome the above-mentioned disadvantages of the prior art methods and devices of this general type, in which a definable order of processing is provided and which allows A/D conversion for simultaneously present requests for A/D conversion. In particular, the aim of the invention is to allow preferential processing of important A/D converter requests.

With the foregoing and other objects in view there is provided, in accordance with the invention, a method for analog-to-digital (A/D) conversion of signals. The method includes the steps of:

a) transmitting a request signal for requesting A/D conversion of an analog signal from at least one of a plurality of converter request sources and each of the converter request sources has an assigned priority;

b) selecting a converter request source requesting the A/D conversion having a highest priority assigned to it; and c) submitting the analog signal requested by the converter request source to an A/D converter for performing the A/D conversion.

According to the present invention, the A/D converter is provided for processing or converting analog signals which are each requested by different A/D converter request sources. Each A/D converter request source, in response to definable results, produces a request for one or more arbitrary signal channels in order to prompt A/D conversion of the appropriate signal by the A/D converter. In this context, the case may arise that requests from different A/D converter request sources are made simultaneously. To be able to overcome this problem, the present invention provides for each request source to have a settable priority assigned to it. As soon as there are requests from request sources for A/D conversion, that request source requesting A/D conversion which has the highest priority assigned to it at this instant is selected, and the requested analog signal from the selected request source is supplied to the A/D converter.

The prioritization or arbitration method (i.e. selection method) proposed according to the present invention can be used to create complex priority structures and to administer them without any additional software or CPU complexity. In particular, a multiplicity of requests from different request sources can be processed in accordance with the application, and hence in accordance with priority. Advantageously, the priorities may be assigned to the different request sources at will and may be freely programmed, so that the A/D converter configuration proposed according to the present invention may easily be matched to the respective requirements. The decision regarding the order in which the individual signal channels are to be converted is automatically made by the hardware of the A/D converter configuration, without any software intervention.

Since, as a rule, each A/D converter request source can request a plurality of channels with appropriate analog signals, it is advantageous that, after the A/D converter request source to be processed has been selected (source prioritization), selection of that signal channel of the previously selected A/D converter request source which is actually to be processed may additionally be provided (channel prioritization) in order thus to determine a particular channel for the A/D conversion when there are request pulses for a plurality of channels of the A/D converter request source already selected previously. The channel to be processed can likewise be selected using a definable priority rule.

In accordance with an added feature of the invention, there is the step of assigning each of the converter request sources a different priority.

In accordance with an additional feature of the invention, there is the step of continually checking each of the converter request sources to determine if a request for A/D conversion is being made by any of the converter request sources. And, if a request from a requesting converter request source has been detected, determining if the requesting converter request source has a higher priority assigned to it than another one of the converter request sources from which the request for A/D conversion has likewise been detected.

In accordance with another feature of the invention, there is the step of selecting the converter request source which has been received first in time, if request signals are simultaneously provided by different ones of the converter request sources having equivalent priorities in each case.

In accordance with further feature of the invention, the priorities assigned to the converter request sources are freely programmable and can thus be changed at will.

In accordance with another added feature of the invention, each of the converter request sources can request analog signals from a plurality of signal channels. And after a respective converter request source has been selected resulting in a selected converter request source, a corresponding signal channel corresponding to the request of the selected converter request source is selected, and the analog signal corresponding to the corresponding signal channel is converted by the A/D converter.

In accordance with another additional feature of the invention, there is the step of selecting the corresponding signal channel of the selected converter request source on a basis of a predetermined priority algorithm, and a corresponding analog signal for the corresponding signal channel selected is supplied to the A/D converter.

In accordance with another further feature of the invention, the converter request source requests A/D conversion by the A/D converter if the request signal for A/D conversion is present for at least one signal channel of the signal channels associated with the converter request source.

With the foregoing and other objects in view there is further provided, in accordance with the invention, an analog-to-digital (A/D) converter circuit containing an A/D converter for A/D conversion of analog signals. A multiplicity of analog signal channels is provided through which an appropriate number of the analog signals can be supplied to the A/D converter. A multiplicity of converter request sources for requesting at least one of the analog signal channels is further provided. The converter request sources generates request signals for requesting A/D conversion of an analog signal associated with a respective signal channel at arbitrary instants. Each of the converter request sources has a priority assigned to it. Selection devices are provided that are each connected to one of the converter request sources and the A/D converter. The selection devices select from the converter request sources requesting the A/D conversion, those of the converter request sources which presently have a highest priority assigned to them, and the selection devices supply the analog signal requested by a selected converter request source to the A/D converter for A/D conversion.

In accordance with an added feature of the invention, the selection devices are configured such that they successively carry out a check of each of the converter request sources to determine if any of the converter request sources is generating a request signal for A/D conversion by the A/D converter. If the request signal from a respective converter request source has been detected, the selection devices determine if the respective converter request source has a higher priority assigned to it than another converter request source from which the request signal for the A/D conversion has likewise been detected.

In accordance with an additional feature of the invention, the selection devices are configured such that, if the request signals are simultaneously provided by different ones of the converter request sources having equal priorities in each case, the selection devices select a respective converter request source which has been checked first in time.

In accordance with another feature of the invention, at least one of the selection devices has a storage device for storing the priority assigned to each of the converter request sources. The storage device and the priority of each of the converter request sources are freely programmable.

In accordance with a further feature of the invention, at least one of the converter request sources contains a control register in which a marker corresponding to a request signal is set when the A/D conversion is requested. The selection devices check for the presence of the request signal from the converter request sources by checking a content of the control register. Each of the converter request sources can request the analog signals from the multiplicity of analog signal channels, and each of the converter request sources sets the marker in the control register if there is a request for A/D conversion present for at least one of the analog signal channels.

At least one of the converter request sources contains a further control register, and each of the analog signal channels associated with a respective converter request source is allocated a specific bit array stored in the further control register. A marker is set in the specific bit array of the further control register if there is a request present for A/D conversion of one of the analog signal channels. The converter request sources are configured such that they set the marker in the control register if the marker indicating the request for the analog signal channel is set in the specific bit array of the further control register.

A further selection device is connected between the A/D converter and one of the selection devices and also between the selection devices. The further selection device is configured such that, after one of the converter request sources requesting A/D conversion has been selected, the further selection device selects a particular one of the analog signal channels and supplies the analog signal corresponding to the particular one of the analog signal channels to the A/D converter.

The further selection device is also configured such that, if simultaneous requests are present for A/D conversion of a multiplicity of the analog signal channels related to a selected converter request source, the further selection device selects the analog signal channel which corresponds to a highest-value bit array which is contained in the further control register of the selected converter request source that has the marker set.

In accordance with a concomitant feature of the invention, after a start of the A/D conversion, the marker in the further control register of the selected converter request source that corresponds to the selected signal channel is erased.

Other features which are considered as characteristic for the invention are set forth in the appended claims.

Although the invention is illustrated and described herein as embodied in a method for A/D conversion of analog signals, and an A/D converter configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
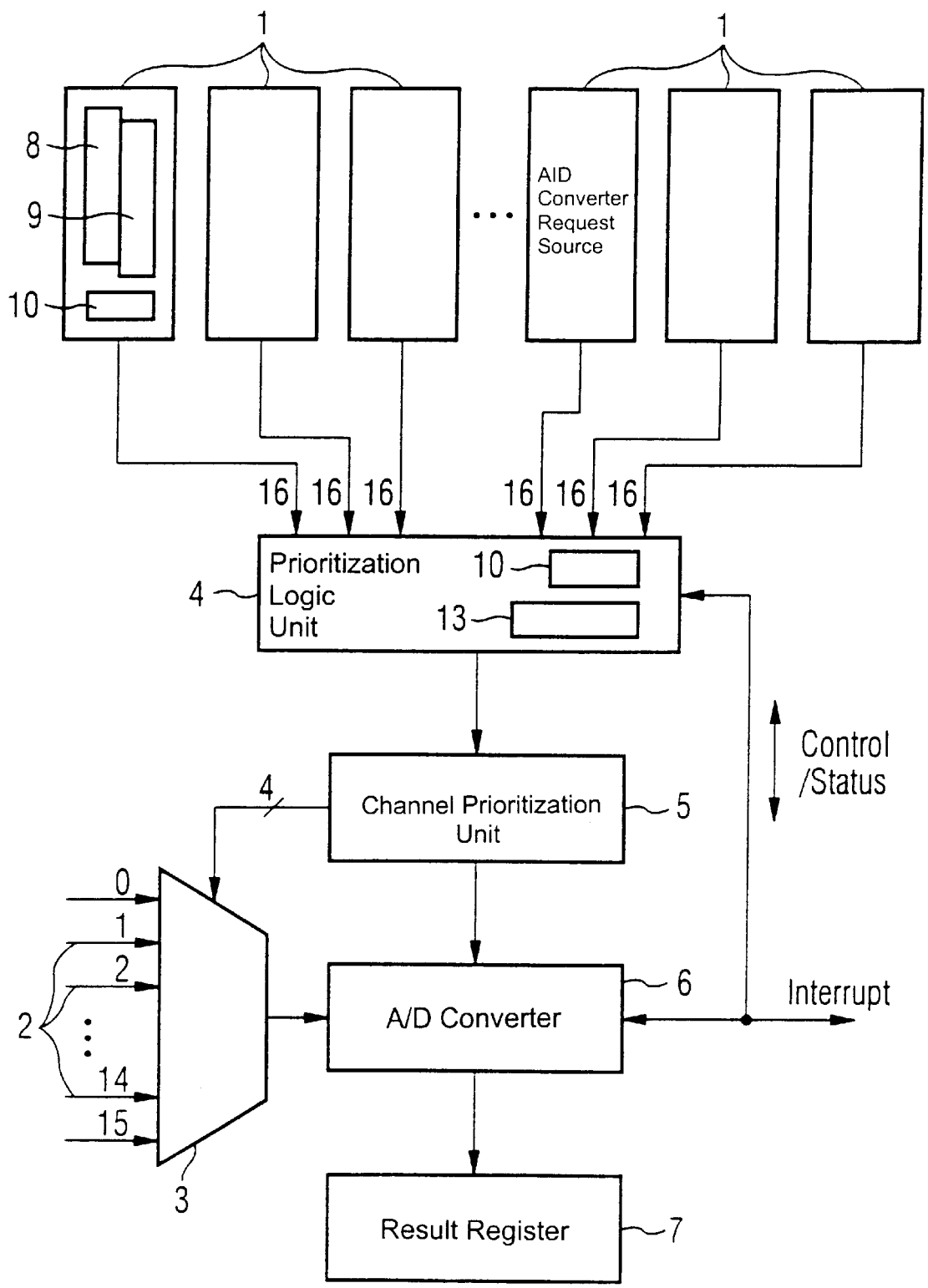
FIG. 1 is a simplified block diagram of an A/D converter configuration according to the invention.

In all the figures of the drawing, sub-features and integral parts that correspond to one another bear the same reference symbol in each case. Referring now to the figures of the drawing in detail and first, particularly, to FIG. 4 thereof, there is shown a simplified block diagram of a known A/D converter configuration as marketed, by way of example, by the applicant under the model designation C167. As can be seen from FIG. 4, an A/D converter 6 is driven via an analog multiplexer 3. The multiplexer 3 is used to select a multiplicity of analog signals which are each assigned to different signal channels 2. The A/D converter 6, which may be in the form of a 10-bit converter, for example, is driven by a control unit 11 which, for its part, accesses a preferably central control register 12. The control register 12 contains a plurality of bit arrays that are important for the control of the A/D converter configuration. Thus, the control register 12 may, by way of example, contain a bit array which defines the particular signal channel 2 to be processed. Depending on the content of the bit array, the control unit 11 drives the multiplexer 3 in such a way that a particular signal channel 2 is selected and the appropriate analog signal is supplied to the A/D converter 6. After a sample of the supplied signal has been converted, the result of the A/D conversion is stored in a result register 7. The analog signal from the signal channel 2 defined by the content of the control register 12 can then be sampled and converted again.

Furthermore, the control register 12 can define the operating mode of the A/D converter configuration. Thus, by way of example, the content of the control register 12 can define that, apart from the aforementioned individual channel conversion, an autoscan conversion is carried out, in which all the channels are converted once in succession starting from the signal channel 2 defined in the control register 12. In this operating mode, the process then starts again from the beginning with the signal channel 2 defined in the control register 12.

Figure 4:
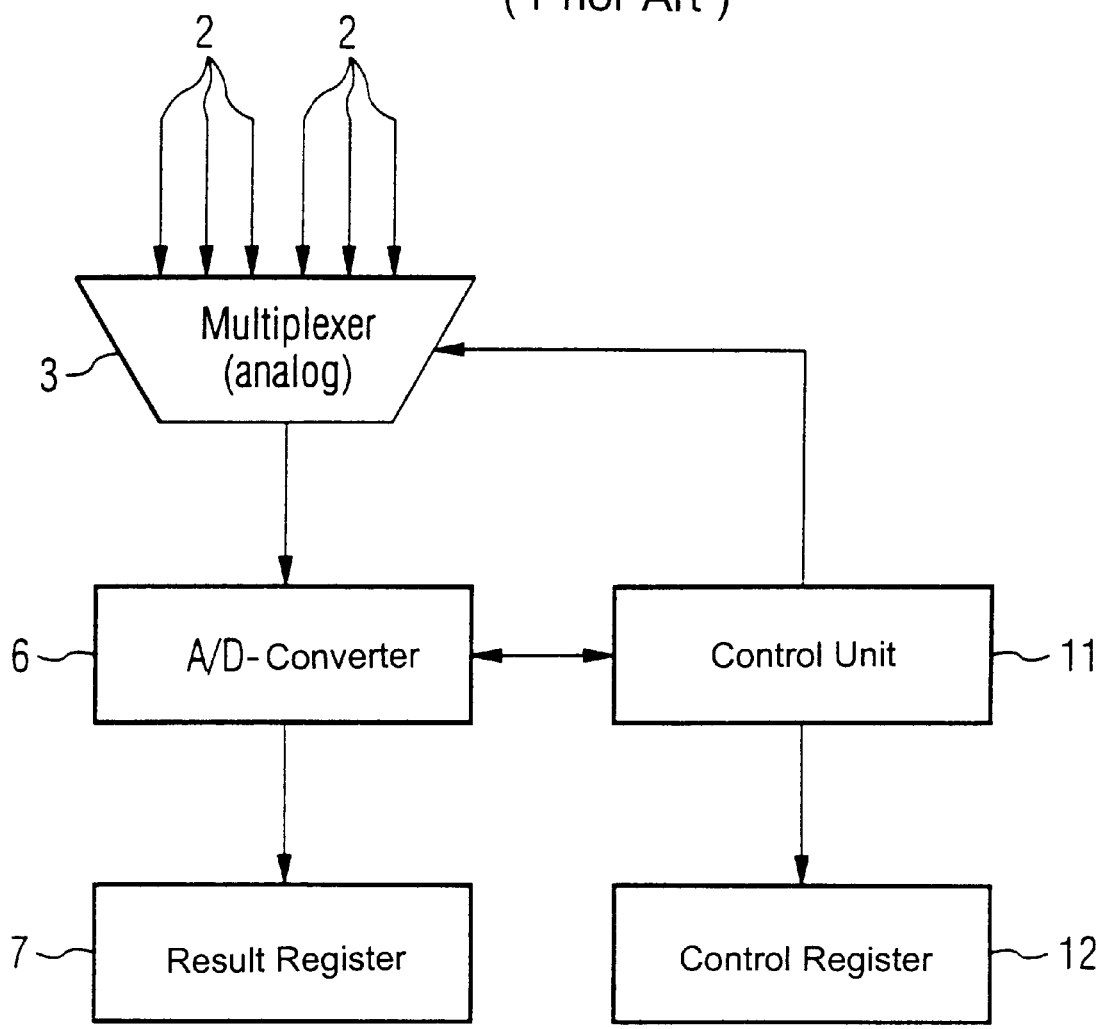
FIG. 4 is a simplified block diagram of a prior art A/D converter configuration.

In the case of the A/D converter configuration shown in FIG. 4, the case may arise that a particular analog signal is to be given preferential treatment for particular reasons. In this case, the programmer, for example using software intervention, can set an appropriate control bit in the register 12, which stipulates that the normal operating cycle defined by the control register 12 is interrupted and the signal channel 2 which is to be given preferential treatment and which can be defined in a further register is temporarily interposed in order to convert the appropriate analog signal. The normal operating mode defined in the control register 12 is then continued again.

It follows from the above description relating to FIG. 4 that, in the case of the known A/D converter configuration shown in FIG. 4, it is not possible for importance to be distinguished automatically or for the different signal channels 2 supplied to the multiplexer 3 to be given automatic preferential treatment. Instead, a complex software intervention initiated externally by a programmer is necessary in order to give preferential treatment to a particular transmission channel.

The constantly increasing number of input channels in A/D converter configurations and the fact that A/D conversion generally involves very time-critical applications make precise observance of the sequence of the signals to be converted absolutely necessary. This is particularly relevant if the analog signals supplied to the multiplexer 3 originate not just from an individual request source, such as a timer or a software application, but from a multiplicity of different request sources. In this case in particular, with requests for A/D conversion being supplied to the A/D converter configuration simultaneously, these requests need to be processed according to prescribed decision criteria (order) and, in particular, on the basis of their importance.

In contrast, the invention of the instant application has the A/D converter configuration shown in FIG. 1 that contains as a central component the A/D converter 6 which has the task of sampling and converting an analog signal which is supplied to it. The converted sample of the respective analog signal is stored in the result register 7 that is coupled to the A/D converter 6.

The analog signals to be processed by the A/D converter 6 can be selected from a plurality of channels that can be requested by various A/D converter request sources 1.

The A/D converter configuration in FIG. 1 contains a plurality of the A/D converter request sources 1 which can each use request signals 16 to request an arbitrary number of the signal channels 2. In addition, the A/D converter configuration has selection units 4,5 which are connected downstream of the A/D converter request sources 1, select one of the analog signal channels 2 requested by the request sources 1 and use the downstream multiplexer circuit 3 to supply it to the A/D converter 6 for conversion. If an event that is specific to the request source 1 occurs, each of the request sources 1 produces a request signal to the selection units 4,5. On the basis of a prescribed priority scheme, that request having the highest priority is selected and the signal channel 2 requested by the request source 1 is supplied to the A/D converter 6 on the basis of the channel prioritization unit 5.

The individual request sources 1 may be different types of request sources 1, so that a different order of processing for the A/D converter requests from the individual request sources 1 may possibly be desired. Thus, by way of example, a request source 1 may be a programmable timer unit (timer) which produces request signals for the A/D converter 6 in a time-controlled manner and, particularly on the basis of a timer clock signal, cyclically requests A/D conversions for the selected signal channels. Furthermore, the request source 1 may be in the form of a hardware device that produces program-controlled request signals for A/D conversion. A request source 1 may likewise be in the form of a queue (FIFO), so that request signals for A/D conversion are produced successively for the individual channels of the request source on the basis of their position in the queue. In this case, the signal channels 2 requested by the appropriate request source 1 are thus processed successively in the manner of a stack. In line with the prior art explained with reference to FIG. 4, the request source 1 may likewise have a conversion insertion mode in order to produce a request signal which is to be processed as a preference. It is also possible for the request source 1 to be a synchronization device that produces a request signal for A/D conversion for a definable signal channel synchronously with a further A/D converter or with an external timer. In addition, the request source 1 may be operated according to a so-called autoscan mode, where request signals for A/D conversion are produced in succession for the appropriate signal channels 2. Finally, the request source 1 may also be in a form such that it produces a request signal for one or more appropriate signal channels 2 on the basis of a particular (external) event, i.e. in event-triggered fashion. Other types of request sources are naturally also possible.

According to the present invention, the A/D converter configuration shown in FIG. 1 has the selection units 4,5 implemented in it which allow A/D enquiries possibly arising from a plurality of request sources 1 at the same time to be processed. According to the illustrative embodiment shown in FIG. 1, the selection units 4,5 contain, a prioritization logic unit 4 for the different request sources 1, and the channel prioritization unit 5 for the requested signal channels 2.

The prioritization logic unit 4 is used for selecting a particular request source 1, which typically corresponds to the request source 1 having the highest priority, if requests for the A/D converter 6 are made by different request sources 1 at the same time. For this purpose, the prioritization logic unit 4 contains a control register 13 in which a priority can be programmed for each individual request source 1. In this configuration, the control register 13 is freely programmable, so that the priorities can be assigned at will by the user. If request signals are provided by a plurality of request sources 1 simultaneously, the prioritization logic unit 4 uses the register content of the control register 13 to ascertain that request source 1 which currently has the highest priority assigned to it and which is at the same time currently requesting the A/D converter 6 for one of its signal channels 2.

In this context, the case may arise that the request source 1 selected by the prioritization logic unit 4 is making requests for a number of the signal channels 2. For this case, the channel prioritization logic unit 5 is provided, which uses a previously defined algorithm to ascertain the signal channel 2 of the request source 1 selected by the request source prioritization logic unit 4 which is actually to be processed by the A/D converter 6, and uses the multiplexer circuit 3 to supply the signal channel to the A/D converter 6. Since the way in which the A/D converter configuration shown in FIG. 1 works has been explained generally above, a closer, detailed explanation of the way in which the prioritization devices 4 and 5 work will be given below.

For the sake of simplicity, the following text assumes that each of the request sources 1 has an essentially comparable hardware configuration. Thus, in accordance with the illustrative embodiment shown in FIG. 1, each request source 1 may contain, in particular, three registers 8–10 whose contents are important for the prioritization of the request sources 1 by the logic unit 4 and the channel prioritization by the logic unit 5.

The first register 8 is equivalent to a trigger control register 8 and contains at least the number of control bits which corresponds to the maximum number of signal channels 2 which can be requested by the respective request source 1. The trigger control register 8 is used to define the analog signal channels 2 for which an A/D converter request is to be placed at present by the request source 1. By setting a control bit in the trigger control register 8, it is thus possible to enable the triggering or production of a request signal for the analog signal channel which corresponds to the set control bit.

The second control register 9 is used as a converter request register 9 and contains the same number of control bits as the register 8. The converter request register 9 stores all the conversion requests which have not yet been processed for the appropriate request source 1. When the trigger event for the request source 1 occurs, the content of the converter request register 9 is updated on the basis of the content of the trigger control register 8. The control bits contained in the converter request register 9 are subjected to logic ORing, and the result of this logic ORing is stored in the form of a set or unset control flag in each case.

The control flag can be administered in the register 10 either in the request source 1 itself or in the prioritization logic unit 4. Therefore, the control flag in the register 10 is set if there is a request for A/D conversion for at least one signal channel 2 of the appropriate request source 1.

The prioritization logic unit 4 now monitors the content of the individual registers 10 for the different request sources 1 and carries out the prioritization or arbitration method described above for the request sources 1. In principle, prioritization is necessary only if a control flag is set by two request sources 1 in two different control registers 10 simultaneously, which indicates the simultaneous presence of request pulses for the A/D converter 6 from two different request sources 1. If there is only one request source 1 which has a control flag set in the register 10, the prioritization logic unit 4 automatically selects this request source 1. For the purposes of synchronizing a plurality of events, the prioritization may also take place continuously, which results in a type of centralized clock signal.

If, on the other hand, the prioritization logic unit 4 has detected, by monitoring the control register 10, that requests for the A/D converter 6 are being made by different request sources 1 simultaneously, the priorities defined in the control register 13 of the prioritization logic unit 4 are used to ascertain and select the request source 1 having the highest priority.

Figure 2:
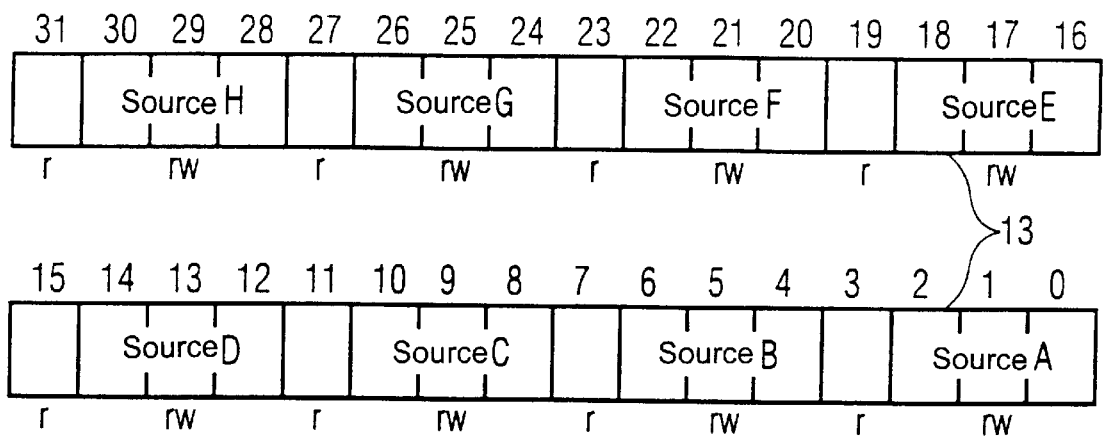
FIG. 2 is an illustration of a detailed structure of an exemplary control register in a prioritization logic unit shown in FIG. 1.

FIG. 2 shows an example of the content of the control register 13. In the example shown in FIG. 2, the control register 13 contains a total of 32 bits, in which case a distinction can be made here between eight different request sources 1, each having a bit array containing four bits assigned to them. This allows 4-bit long priorities to be produced for each request source 1. Of these, the first three bits in each bit array are freely programmable in each case and define the priority of the respective request source. Accordingly, these bits are denoted in FIG. 2 by "rw" for "read/write". By contrast, the fourth bit has the fixed value "0" and cannot be overwritten, so that this bit is denoted by "r" for "read only". Any other occupancy of the priority bits in the bit array or in the control register 13 would also be conceivable, however.

The initialization value for the control register 13 shown in FIG. 2 may be set as follows, for example:

| Source | H | G | F | E | D | C | B | A |
| --- | --- | --- | --- | --- | --- | --- | --- | --- |
| | 0000 | 0001 | 0010 | 0011 | 0100 | 0101 | 0110 | 0111. |

In the context of this so-called inverse logic, it is assumed that a relatively low binary value denotes a relatively high is priority, so that, on the basis of this initialization value, the request source 1 having the bit array for source H is assigned the highest priority and the request source for the bit array for source A is assigned the lowest priority. Advantageously, each request source is assigned a different priority.

Figure 3:
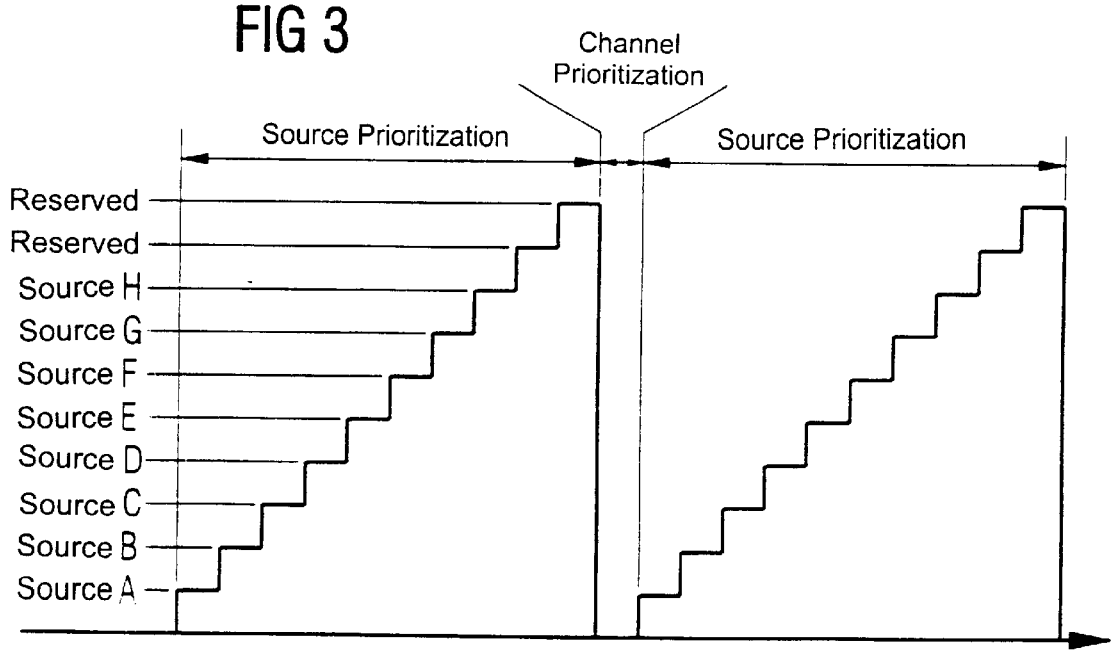
FIG. 3 is a graph showing an example of a time sequence for a source and channel prioritization carried out by the A/D converter configuration shown in FIG. 1.

As FIG. 3 shows, the prioritization logic unit 4 shown in FIG. 1 successively carries out a check for each different bit array in the control register 13, that is to say for each request source A–H, to determine whether the control flag which would indicate the presence of a request pulse for the A/D converter 6 is set in the appropriate control register 10. In the present case, the prioritization logic unit 4 repeats ten successive clock cycles for the purpose of request source prioritization, which, together with the channel prioritization, stipulates the total period for a complete arbitration cycle. In the present example, the request sources 1 are disposed in increasing order of processing, this order naturally also being able to be effected according to other criteria.

As FIG. 3 shows, the request source A assigned to the bit array for source A is checked. The request sources B–H corresponding to the bit arrays are then checked, with a check being carried out to determine whether the appropriate request source has a higher priority assigned to it than a request source already checked previously for which a control flag in the register 10 had already previously been established as being set. The last two clock cycles of the prioritization logic unit 4 are not yet assigned to any particular request source in the illustrative example shown in FIG. 3 and are reserved for later applications. After the individual request sources A–H have been checked successively, the prioritization logic unit 4 is informed about which of the request sources 1 presently requesting the A/D converter 6 has the highest priority, so that the prioritization logic unit 4 can select the appropriate request source 1, and channel prioritization for the request sources 1 can be started.

If a plurality of request sources 1 have been assigned the same priority and the request sources 1 are simultaneously providing request signals for the A/D converter 6, the prioritization logic unit 4 preferably selects that one of the request sources 1 which has been checked first in the order of the request source prioritization.

When request source prioritization is complete, i.e. at the end of ten clock periods of the prioritization logic unit 4 in the case of the example shown in FIG. 3, the prioritization logic unit 5 carries out the channel prioritization already explained with reference to FIG. 1. The channel prioritization is carried out immediately after the end of the request source prioritization within the next clock period and is used to determine which signal channel 2 of the request source 1 selected by the prioritization logic unit 4 is actually to be supplied to the A/D converter 6 using the multiplexer circuit 3. In this context, the case may arise that requests for the A/D converter 6 are made simultaneously for a plurality of signal channels 2 of one and the same request source 1 and are recorded in the converter request register 9 in the appropriate request source 1. For this reason, the prioritization logic unit 5 monitors the control bits set in the converter request register 9 for the request source 1 selected by the prioritization logic unit 4 and, in accordance with the present illustrative embodiment, selects that signal channel 2 which corresponds to the highest-value control bit that is set in the converter request register 9. The channel prioritization can also take place on the basis of other criteria, however. The selected signal channel 2 is finally supplied to the A/D converter 6 using the multiplexer circuit 3, and the A/D conversion is started, provided that this is possible at this instant. If the A/D converter configuration 6 is still busy converting a previously selected signal channel 2, then either the conversion in progress can be terminated and repeated later or the end of the conversion in progress is awaited so that the new conversion can be started immediately afterwards. Since the arbitration method is continuously in progress, it is always evident at the end of the conversion in progress which request source 1 and which signal channel 2 has "won" the last arbitration cycle to have finished and thus represents the most up-to-date request.

When the A/D conversion for the signal channel 2 selected by the prioritization logic units 4,5 has started, the control bit corresponding to the selected signal channel 2 in the converter request register 9 is erased in the request source 1 selected by the prioritization unit 4. A further possibility is for the control bits corresponding to the selected signal channel 2 to be erased in the converter request registers 9 in all the available request sources 1 or in the request sources 1 selected for this purpose. The channel prioritization logic unit 5 can naturally also use another prioritization method or prioritization algorithm to determine the signal channel 2 that is to be converted.

We claim:

1. A method for analog-to-digital (A/D) conversion of signals, which comprises the steps of:
   transmitting a request signal for requesting A/D conversion of an analog signal from at least one of a plurality of converter request sources and each of the converter request sources has a freely-programmable, changeable-at-will assigned priority;
   selecting a converter request source requesting the A/D conversion having a highest priority assigned to it; and
   submitting the analog signal requested by the converter request source to an A/D converter for performing the A/D conversion.

2. The method according to claim 1, which comprises assigning each of the converter request sources a different priority.

3. The method according to claim 1, which comprises continually checking each of the converter request sources to determine if a request for A/D conversion is being made by any of the converter request sources, and, if a request from a requesting converter request source has been detected, determining if the requesting converter request source has a higher priority assigned to it than another one of the converter request sources from which the request for A/D conversion has likewise been detected.

4. The method according to claim 1, which comprises selecting the converter request source which has been received first in time, if request signals are simultaneously provided by different ones of the converter request sources having equivalent priorities in each case.

5. The method according to claim 1, wherein each of the converter request sources can request analog signals from a plurality of signal channels, and after a respective converter request source has been selected resulting in a selected converter request source, a corresponding signal channel corresponding to the request of the selected converter request source is selected, and the analog signal corresponding to the corresponding signal channel is converted by the A/D converter.

6. The method according to claim 5, which comprises selecting the corresponding signal channel of the selected converter request source on a basis of a predetermined priority algorithm, and a corresponding analog signal for the corresponding signal channel selected is supplied to the A/D converter.

7. The method according to claim 6, wherein the converter request source requests A/D conversion by the A/D converter if the request signal for A/D conversion is present for at least one signal channel of the signal channels associated with the converter request source.

8. An analog-to-digital (A/D) converter circuit, comprising:
   an A/D converter for A/D conversion of analog signals;
   a multiplicity of analog signal channels through which an appropriate number of the analog signals can be supplied to said A/D converter;
   a multiplicity of converter request sources, at least one of said converter request sources generating request signals for requesting A/D conversion of an analog signal associated with a respective signal channel at arbitrary instants, each of said converter request sources having a freely-programmable priority assigned to it; and
   selection devices each connected to one of said converter request sources and said A/D converter, at least one of said selection devices having a freely-programmable storage device for storing the priority assigned to each of said converter request sources, said selection devices selecting from said converter request sources requesting the A/D conversion, those of said converter request sources presently having a highest priority assigned to them, and said selection devices supplying the analog signal requested by a selected converter request source to said A/D converter for A/D conversion.

9. The A/D converter circuit according to claim 8, wherein each of said converter request sources has a different priority.

10. The A/D converter circuit according to claim 8, wherein said selection devices are configured such that they successively carry out a check of each of said converter request sources to determine if any of said converter request sources is generating a request signal for A/D conversion by said A/D converter, and, if the request signal from a respective converter request source has been detected, said selection devices determine if said respective converter request source has a higher priority assigned to it than another converter request source from which the request signal for the A/D conversion has likewise been detected.

11. The A/D converter circuit according to claim 10, wherein said selection devices are configured such that, if the request signals are simultaneously provided by different ones of said converter request sources having equal priorities in each case, said selection devices select a respective converter request source which has been checked first in time.

12. The A/D converter circuit according to claim 8, wherein at least one of said converter request sources contains a control register in which a marker corresponding to a request signal is set when the A/D conversion is requested, and said selection devices monitor for a presence of the request signal from said converter request sources by checking a content of said control register.

13. The A/D converter circuit according to claim 12, wherein each of said converter request sources can request the analog signals from said multiplicity of analog signal channels, and each of said converter request sources sets the marker in said control register if there is a request for A/D conversion present for at least one of said analog signal channels.

14. The A/D converter circuit according to claim 13, wherein at least one of said converter request sources contains a further control register, and each of said analog signal channels associated with a respective converter request source is allocated a specific bit array stored in said further control register, and a marker being set in the specific bit array of said further control register if there is a request present for A/D conversion of one of said analog signal channels, said converter request sources configured such that they set the marker in said control register if the marker indicating the request for the analog signal channel is set in the specific bit array of said further control register.

15. The A/D converter circuit according to claim 14, including a further selection device connected between said A/D converter and one of said selection devices and also between said selection devices, said further selection device configured such that, after one of said converter request sources requesting A/D conversion has been selected, said further selection device selects a particular one of said analog signal channels and supplies the analog signal corresponding to said particular one of said analog signal channels to said A/D converter.

16. The A/D converter configuration according to claim 15, wherein said further selection device is configured such that, if simultaneous requests are present for A/D conversion of a multiplicity of said analog signal channels related to a selected converter request source, said further selection device selects said analog signal channel which corresponds to a highest-value bit array which is contained in said further control register of said selected converter request source that has the marker set.

17. The A/D converter circuit according to claim 16, wherein, after a start of the A/D conversion, the marker in said further control register of said selected converter request source which corresponds to the selected signal channel is erased.

18. A method for analog-to-digital (A/D) conversion of signals, which comprises the steps of:

transmitting a request signal for requesting A/D conversion of an analog signal from at least one of a plurality of programmable converter request sources, each of the converter request sources being able to request analog signals from a plurality of signal channels;

assigning a respective priority to each of the converter request sources;

selecting a converter request source requesting the A/D conversion having a highest priority assigned to it;

selecting a corresponding signal channel corresponding to the request of the selected converter request source based on a predetermined priority algorithm; and submitting the analog signal corresponding to the corresponding signal channel to an A/D converter for performing the A/D conversion.

19. An analog-to-digital (A/D) converter circuit, comprising:

an A/D converter for A/D conversion of analog signals;

a multiplicity of analog signal channels through which analog signals can be supplied to said A/D converter;

a multiplicity of converter request sources each for simultaneously requesting A/D conversion of analog signals from a plurality of said analog signal channels, and each of said converter request sources having a programmable respective priority assigned to it based on a predetermined priority algorithm; and selection devices each connected to a respective one of said converter request sources and said A/D converter, said selection devices selecting an analog signal channel for A/D conversion corresponding to the converter request source converter having a highest priority, and said selection devices supplying the analog signal for the corresponding signal channel to said A/D converter for A/D conversion.

* * * * *